Figure 1:
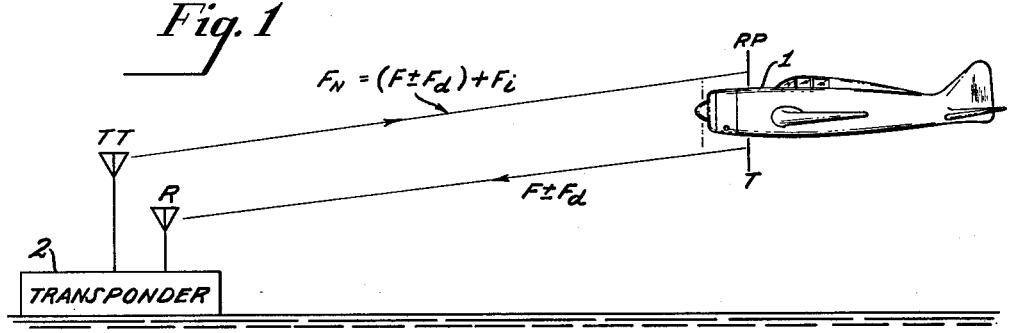

Oct. 31, 1950      M. G. CROSBY      2,528,119

FREQUENCY MODULATION RANGE FINDER

Filed April 25, 1947      2 Sheets-Sheet 1

INVENTOR.
Murray G. Crosby
BY
H. S. Grover
ATTORNEY.

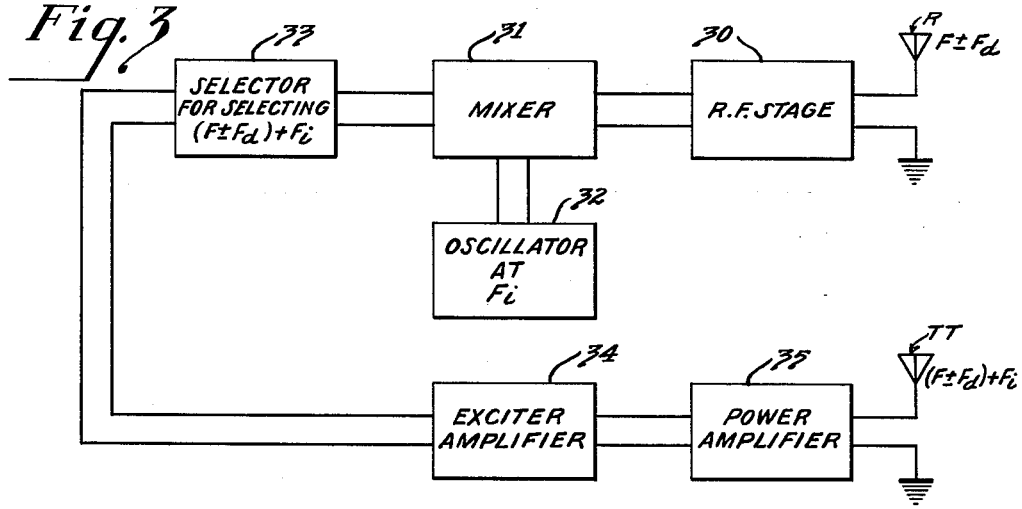
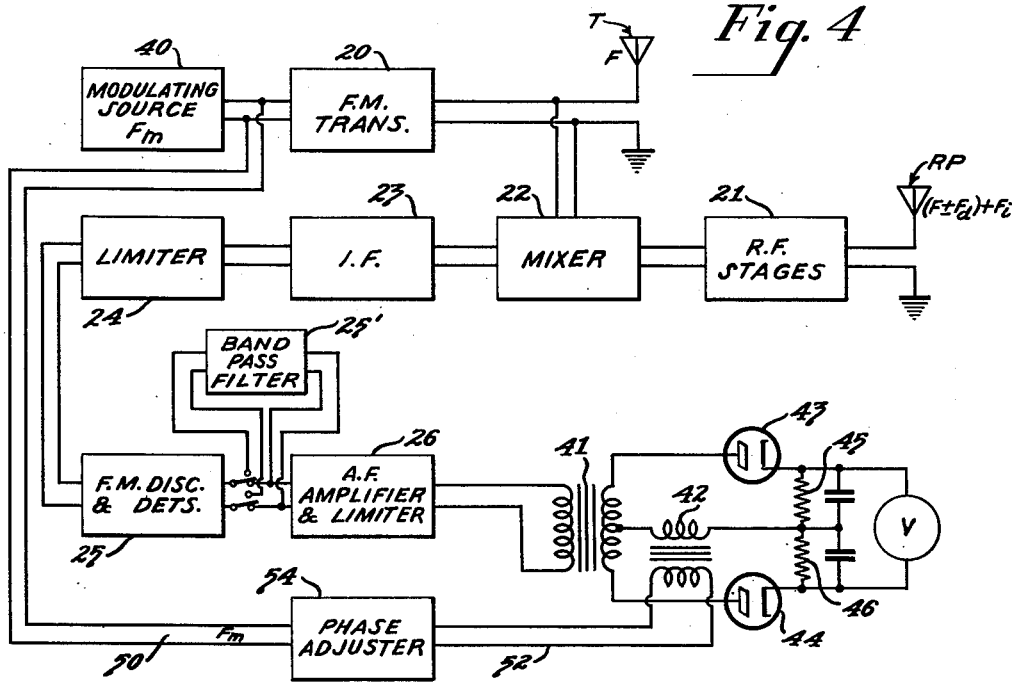

Patented Oct. 31, 1950

2,528,119

UNITED STATES PATENT OFFICE 2,528,119

FREQUENCY MODULATION RANGE FINDER

Murray G. Crosby, Upper Montclair, N. J., assignor to Radio Corporation of America, a corporation of Delaware Application April 25, 1947, Serial No. 743,961

3 Claims. (Cl. 343—14)

This application concerns range finders, and more particularly, a type of radio range finder in which a wave is transmitted to the distant point where it is received and re-transmitted back to the point of origin. By this means, the time of transmission of the wave in the round trip to and from the distant point may be measured, and from the time of transmission the distance traversed may be determined.

In the prior art systems of this type, various forms of pulse-transmission have been used. In these systems, a pulse of radio-frequency energy is transmitted to the distant point, where it is received and transmitted back to the point of origin. The time delay between the re-transmitted and received pulse, and the originally transmitted pulse is measured to give an indication proportional to distance. Since the velocity of transmission of a radio wave is accurately known, the distance may be readily determined from a measurement of the time of transmission.

In the prior art systems, which use pulse-transmission, the re-transmission of the wave at the distance point takes place on the same frequency as the originally transmitted wave. Interference between the originally transmitted pulse and the returning pulse is avoided since the two pulses occur at different time intervals.

The system of this invention uses a continuous wave, frequency modulated signal. Frequency modulation has been used for range finding in systems such as radio altimeters and similar devices which depend upon a reflection of the wave from an object at the distant point. See for example, my Patent #2,268,643 dated January 6, 1942. In the system of the present invention, the wave is received at the distant point and re-transmitted by means of a system called a "Transponder." The "Transponder" is means for picking up the transmitted wave sent out from a transmitter on say a plane and for sending a wave back to the plane to be used in determining the distance from the sending station to the "Transponder." The station on the plane has been designated herein an Interrogator and includes with the transmitter, receiving and distance measuring means. If a Transponder were used with the prior art frequency modulation schemes of the type used in the radio altimeter, difficulties would arise in the design of the Transponder, since the receiver and transmitter of the Transponder are on the same frequency. Such a same-frequency operation of a Transponder is difficult, due to the tendency of feed back from the transmitting to the receiving antennas, which results in self-sustained oscillations in the system. Antenna directivity is usually relied upon to prevent this type of feed back, but since in the present range finder both antennas are directed upon the same point, such feed back isolation by directivity is difficult.

An object of my present invention is provision of an improved range finding system wherein there is no feed back of the type mentioned above and no need of means such as antenna directivity to overcome the same. I attain this object by separating the frequencies of the Transponder receiver and transmitter by a sufficient frequency difference so that frequency selectivity may be employed to prevent feed back.

To accomplish this separation, I frequency-modulate a carrier at the plane and at the ground station. I beat this frequency modulated carrier with other oscillations and transmit a beat note back to the plane. In this new method and means of distance measuring, there is no feed back of the nature described above. When such a system is utilized at the Transponder, a different type of indicating system is required at the range-determining point, because known distance measuring receivers are ineffective for reception of transmission as described above. A further object of my invention is provision of a new receiver system at the Interrogator station for comparing the transmitted wave with the received wave to measure the distance they have traveled, and supply accurate indications of the same.

An important advantage of the continuous-wave type of range finder of the present invention is that it is readily adapted to a meter-type of indicator. The pulse-modulated type of range finder normally uses a cathode-ray-type of indicating device. When the pulse-modulated range finder is applied to meter indication, a considerable number of amplifier tubes and complicated circuits are required.

Figure 1A:
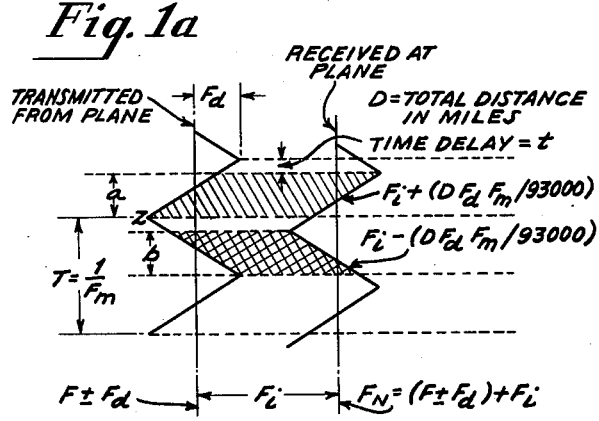
Figure 1B:
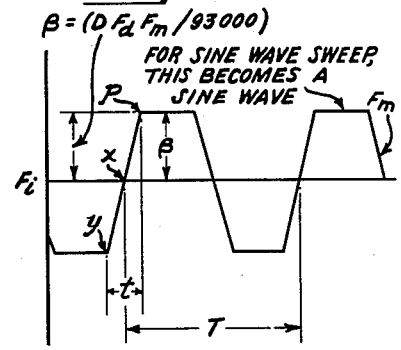
Figure 2:
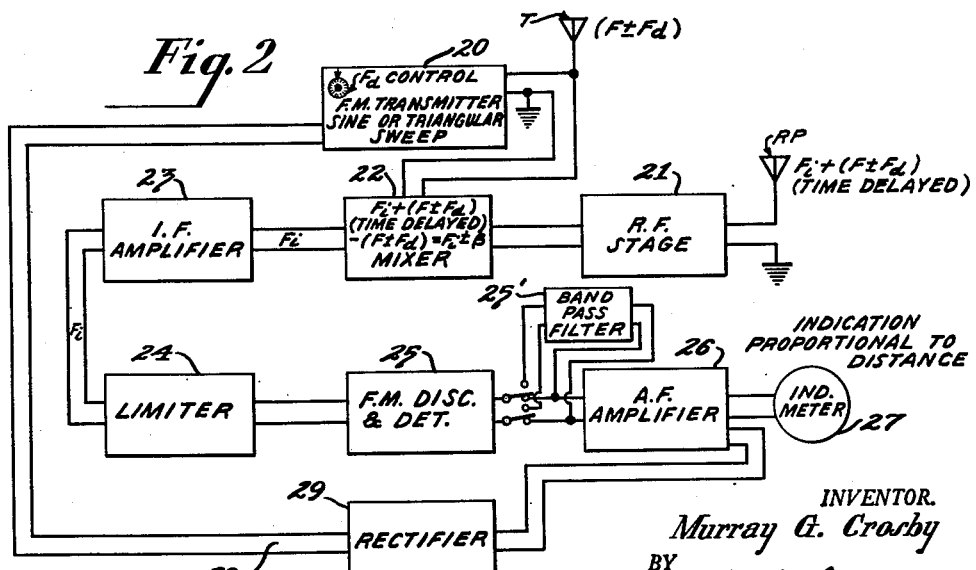

In describing my invention, reference will be made to the attached drawings wherein;

Fig. 1 illustrates schematically a distance measuring system arranged in accordance with my invention, Figs. 1a and 1b illustrate by wave form and wave phase relation the novel manner in which I measure distance in my improved system, Fig. 2 illustrates schematically and mainly by block diagram, the essential features of a transmitting and receiving system such as might be used on a plane and arranged in accordance with my invention, Fig. 3 illustrates schematically the equipment at the ground station designated herein also as the Transponder; while Fig. 4 illustrates a modification of the arrangement of Fig. 2 for use on the plane and includes improved detection means for determining the distance between the Interrogator and Transponder stations and producing indications thereof.

Fig. 1 shows the manner in which my invention is arranged and used to determine the distance between an aeroplane and a ground station. Aeroplane 1 sends out a signal in the form of a frequency modulated carrier from transmitting antenna T. The carrier is frequency modulated to a deviation $F_d$ in accordance with a triangular or sinusoidal wave form of constant frequency $F_m$. This frequency modulated carrier wave is received on the receiving antenna R of the ground station Transponder 2. The carrier as frequency modulated is then heterodyned to a new frequency $FN = (F \pm F_d + F_i)$, where $F_i$ is the difference between the wave received by the Transponder, and the wave transmitted by the transmitter of the Transponder from antenna TT. The new frequency is received on receiving antenna RP on the aeroplane.

The principle of operation of this invention depends upon a measurement of the difference between the wave frequencies transmitted from the aeroplane and received at the plane from the Transponder. Fig. 1a shows how these two frequencies differ for the case of a triangular frequency modulation at the plane transmitter and at the Transponder. It is apparent that if there is no time delay between the transmitted and the received wave, the frequency difference between the two waves will be a constant equal to $F_i$, which is the difference separation applied at the Transponder. If there is a time delay between the transmitted and received waves, the frequency separation is different on opposite halves of the triangular cycle. In the region $a$ the frequency separation is greater than that in the region $b$. The separation at the region $a$ is equal to $F_i + (D\ F_d F_m / 93,000)$ where $D$ = distance in miles from the Interrogator transmitter to the Transponder, $F_d$ = peak frequency deviation, and $F_m$ = modulating frequency. The amount $$(D\ F_d F_m / 93,000)$$

is added to $F_i$ in the region $a$ by virtue of the time delay introduced due to the transmission over the total distance D. This amount is subtracted from $F_i$ in the region $b$. The frequency difference $(D\ F_d F_m / 93,000)$ is derived by a consideration of the geometry of Fig. 1a, and is the same as that obtained in the radio altimeter practice. The derivation of this formula is given in the January 1939 issue of Bell System Technical Journal, page 222, "A Terrain Clearance Indicator" by Espenschied and Newhouse.

In further contra-distinction with the systems of the prior art, this embodiment of the present invention utilizes, for indicating purposes, this frequency difference $(D\ F_d F_m / 93,000)$ as a frequency deviation or modulation depth instead of as a beat note. The difference is added to, or subtracted from, the quantity $F_i$ in such a manner that it produces a frequency-modulated wave which is modulated in depth by an amount proportional to the distance D in miles and at a rate equal to $F_m$. The indicating device is thus a frequency modulation receiving system which detects the frequency modulation on the wave modulated from the heterodyned difference between the transmitted and received waves. This frequency modulation is a square wave as shown in Fig. 1b for the case of a triangular modulating wave. When the modulating wave is a sine wave, the received modulating wave is also a sine wave. The distance indicating meter is thus a meter which measures the amplitude of the frequency modulation on the received difference frequency.

Fig. 2 shows the range finding equipment that would be employed on the aeroplane. Transmitter 20 radiates the frequency modulated wave $(F \pm F_d)$ from transmitting antenna T. Receiving antenna RP on the plane receives the wave from the Transponder which has a frequency $F_i + (F \pm F_d)$ and a time delay $t$. This wave is amplified in radio-frequency amplifier 21 and converted to an intermediate frequency $(F_i \pm \beta)$ in mixer 22. This mixer beats energy of the transmitted frequency $(F \pm F_d)$ with the time delayed high frequency oscillation $F_i + (F \pm F_d)$ received on antenna RP. The output of the mixer 22 includes the difference or mean frequency $(F_i \pm \beta)$ which is selected and amplified in intermediate frequency amplifier 23. If the distance D is zero, $\beta$ is zero and $F_i$ is a constant frequency. For finite values of distance, the intermediate frequency is modulated plus and minus by the amount $\beta = (D\ F_d F_m / 93,000)$ as shown in Figs. 1a and 1b. This intermediate frequency wave of mean frequency $F_i$ is limited in limiter 24 and applied to frequency modulation discriminator and detector 25. The detected frequency modulation output is an A.-C. wave of frequency $F_m$ and having an amplitude proportional to distance. It is amplified in amplifier 26 and applied to indicating meter 27, which may be calibrated in distance units. The range of this meter may be controlled by varying modulation depth $F_d$ by means of the "$F_d$ control" in transmitter 20. Transmission line 28 comprises an alternative means and method for controlling the depth of the originally applied frequency modulation of transmitter 20 in an automatic control arrangement. The modulation appearing in the amplifier 26 is rectified in rectifier 29 and a potential which is proportional to the average A.-C. wave amplitude is fed back to an electrode of an amplifier in 20 in a sense to reduce the amplifier gain and modulation magnitude and the depth of modulation $F_d$. At the same time, when the amplitude of the A.-C. wave is small, the depth of modulation $F_d$ is increased. This arrangement expands the scale for the short distance indications and contracts it for the long distance indications thereby facilitating indication especially in the more important short distance range. This arrangement for modulation level control is similar to that described in my U. S. Patent 2,268,643, and since the principle is completely described therein, the brief description given above is deemed sufficient.

Fig. 3 shows the Transponder, or ground equipment. The signal from the plane having a mean frequency F, is received on antenna R and amplified in radio-frequency amplifier 30. Mixer 31 converts the incoming wave from a frequency $(F \pm F_d)$ to a frequency $(F \pm F_d) + F_i$. To do this, the heterodyne oscillator 32 for the converter of 31 oscillates at frequency $F_i$. Unit 33 may comprise a band pass amplifier which selects the mean frequency $(F \pm F_d) + F_i$. This selected band of energy is fed to exciter amplifier 34 and power amplifier 35 for radiation on transmitting antenna TT. It will be understood that the Transponder may be arranged to transmit the frequency $(F \pm F_d) - F_1$ in place of $(F \pm F_d) + F_1$ if so desired.

Fig. 4 shows a type of indicating system which utilizes a measurement of the phase difference between the modulating wave $F_m$ from modulating source 40 and the modulation on the wave $(F \pm F_d) + F_1$ received on receiving antenna RP. The components 20 and 25 inclusive in Fig. 4 are the same as the correspondingly numbered components in Fig. 2. Since in this embodiment, I do not rely on depth of modulation of the frequency $F_1$ but do rely on phase variations between the modulation at the source 40 and the modulation on the returned wave, amplifier 26 may include an amplitude limiter to remove amplitude variations. The modulating wave (delayed by traveling the distance 2D) and received from the audio frequency amplifier 26 and limiter is applied to a phase detector composed of push-pull transformer 41, common leg transformer 42 and diodes 43, 44, together with bypassed resistors 45 and 46. The wave $F_m$ used for modulating $F$ is applied by lines 50 and 52 to the primary winding of transformer 42. A phase shifter 54 is included in these connections. A phase displaced relation, as desired, is produced between the modulation from source 40 and that from amplifier 26. This phase relation then varies as the distance traveled by the wave of frequency $(F \pm F_d) + F_1$ varies to correspondingly vary the phase of the modulation $F_m$ therein. Variations of the relative phases of the modulations applied at phase detector inputs 41 and 42 causes variations in the resultant amplitude of the detected currents fed to V. This phase detector then detects the phase difference between the modulating source wave from 40 and the detected frequency modulation wave re-transmitted from the Transponder. The phase difference between these two waves is a measure of the time of transmission from the plane to the Transponder and return, and is therefore, a measure of the distance traversed.

From a study of Figs. 1a and 1b, it may be seen that the phase shift of the received frequency modulation is equal to one-half the phase difference between the transmitted and the received wave. $F_m$ passes through zero ("$x$" in Fig. 1b) at the point midway between region $a$ and region $b$ from which it follows that it shifted in phase an amount equal to one-half the phase difference between the two modulation envelopes. In other words, the point $y$ on $F_m$ (in Fig. 1b) is fixed by the location of point $z$ on the transmitted wave in Fig. 1a. Point $p$ slides on the time scale in proportion to the time delay $t$. The phase delay is thus given by:

$$\phi = \frac{t}{T} 360 = tF_m 360$$

where $t$=time of transmission
$F_m$=modulation frequency
$T$=modulation period

From the known transmission velocity of a radio wave, the above phase delay resolves to a phase delay of 1.935° per mile separation between aeroplane and Transponder for a modulation frequency of 1,000 cycles.

From the above it may be seen that a phase difference of approximately 2° per mile is obtained when a modulation frequency of 1,000 cycles is applied from 40. This gives an indication appearing across resistors 45, 56 which is applied to indicating meter V as the distance indication.

The phase detection system of Fig. 4 has a further advantage with respect to the operation of more than one aeroplane on a given frequency. Such a phase detector is relatively insensitive to a frequency different from that of the modulating source 40. Consequently, each aeroplane may have a different modulating frequency to avoid interference between aeroplanes. When a different modulation frequency is applied to the phase detector, the phase indication is an alternating voltage which does not affect the indicating meter V. The indicating meter thus is responsive only to its own modulating frequency. This selectivity may be improved by the insertion of a band pass filter 25', tuned to $F_m$, preceding amplifier and limiter 26.

The equipment of Fig. 2 is also capable of a multiplex arrangement in which different aeroplanes would use different modulating frequencies. In such a multiplex arrangement, a band pass filter 25' tuned to select the modulation frequency applied in 20 is interposed between the output of detectors 25 and the indicating meter 27, say for example, between detectors 25 and 26. The indicating meter then responds only to the particular modulation frequency applied to transmitter 20 and passed by the filter.

The frequency modulation transmitter in unit 20 then includes a modulation source of constant frequency $F_m$ and in the example given, of triangular wave form. It also includes a constant frequency carrier source of frequency F and a frequency modulator preferably of the reactance tube type. This apparatus is known in the art and needs no further description here. See, for example, my U. S. Patent 2,279,659 dated April 14, 1942. The mixer in 22 may be a simple modulator or demodulator. The selective circuits, amplifier and tuners in unit 21 may be conventional as may the I. F. selectors and amplifiers in unit 23. A conventional limiter may be used in unit 24 but preferably a limiter as disclosed in my U. S. Patent 2,276,565 dated March 17, 1942. The discriminator and detector in unit 25 may be of the Conrad type or of the Seeley type or modifications thereof. The amplifier 26 in Fig. 2 and amplifier and limiter in Fig. 4 may be conventional. The apparatus in unit 26 of Fig. 2 may include a rectifier or a separate rectifier 29 may be provided for producing the control potential which operates on the modulator in 20 to reduce the swing as the distance D increases. 27 is an A.-C. indicating meter which may be calibrated directly in distance units. In Fig. 3, the oscillator 32 which is of constant frequency may be conventional, also, the mixer 31, selector 33, exciter 34, power amplifier 35 and radio frequency stage 30. The modulation source 40 may also be conventional in fact, may be of triangular or sine wave form. It is of constant frequency as explained above and shown in Fig. 1a.

What is claimed is:

1. In apparatus for measuring the distance between two stations separated by space, wave generating and modulating apparatus at one station for frequency modulating a carrier by oscillations of substantially constant frequency and transmitting the carrier so modulated to the other station, a receiver and frequency converter at the other station for developing a corresponding modulated second carrier differing in frequency from said first carrier by a selected difference frequency, apparatus for transmitting said second carrier back to said one station, a mixing stage at said one station for mixing said second modulated carrier with said first modulated carrier to eliminate the modulations and derive said difference frequency which is now phase modulated to a depth depending on the distance between the said stations and a phase modulation detector for measuring the depth of said modulation to ascertain said distance.

2. In apparatus for measuring the distance between two stations located at geographically spaced points, wave generating and modulating apparatus at one station for frequency modulating a carrier by oscillations of constant frequency and transmitting the carrier so modulated to the other station, a receiver and frequency converter at the other station for developing a correspondingly modulated second carrier differing in frequency from said first carrier by a selected difference frequency, apparatus for transmitting said second carrier back to said one station, a mixing stage at said one station for mixing said second modulated carrier with said first modulated carrier to eliminate the modulations and derive said difference frequency which is now phase modulated to a depth depending on the distance between the said stations, a phase modulation detector for measuring the depth of said modulation on said difference frequency, a meter connected to said phase detector and a rectifier coupled to said phase detector and to said first apparatus to reduce the depth of modulation therein as the average magnitude of the modulation on the said difference frequency increases.

3. The method of measuring the distance between two stations separated by space which includes these steps, at one station modulating a carrier by oscillations of substantially constant frequency and transmitting the same to the other station, at the other station converting the modulated carrier to a correspondingly modulated second carrier differing in frequency from said first carrier by a difference frequency, transmitting said second carrier back to said one station, at said one station mixing said second modulated carrier with said first modulated carrier to derive said difference frequency which is modulated to a depth depending on the distance between the said stations, automatically controlling the depth of modulation of the carrier at said one station as a function of the distance between said stations, and measuring the depth of said modulation to ascertain said distance.

MURRAY G. CROSBY.

REFERENCES CITED

The following references are of record in the file of this patent:

UNITED STATES PATENTS

| Number | Name | Date |
|---|---|---|
| 2,416,741 | Eltgroth | Mar. 4, 1947 |
| 2,421,394 | Schelleng | June 3, 1947 |
| 2,445,562 | Cawein | July 20, 1948 |
| 2,451,822 | Guanella | Oct. 19, 1948 |

FOREIGN PATENTS

| Number | Country | Date |
|---|---|---|
| 581,568 | Great Britain | Oct. 17, 1946 |